(12) United States Patent
Kawabata et al.

(10) Patent No.: US 9,891,873 B2
(45) Date of Patent: Feb. 13, 2018

(54) PRINT SYSTEM, DISPLAY CONTROL DEVICE, DISPLAY CONTROL METHOD, AND NON-TRANSITORY COMPUTER READABLE MEDIUM THAT SPECIFIES A STORAGE MEDIUM TO BE REPLACED

(71) Applicant: FUJI XEROX CO., LTD., Tokyo (JP)

(72) Inventors: Nobuhide Kawabata, Kanagawa (JP); Yasuhiro Mori, Kanagawa (JP); Satoshi Misawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/098,699

(22) Filed: Apr. 14, 2016

(65) Prior Publication Data
US 2017/0123738 A1    May 4, 2017

(30) Foreign Application Priority Data

Oct. 30, 2015    (JP) .................................. 2015-214866

(51) Int. Cl.
*G06F 3/12*    (2006.01)
*G06F 11/07*    (2006.01)
*G06K 15/00*    (2006.01)

(52) U.S. Cl.
CPC ............ *G06F 3/1235* (2013.01); *G06F 3/121* (2013.01); *G06F 3/1279* (2013.01); *G06F 3/1294* (2013.01); *G06F 11/07* (2013.01); *G06K 15/408* (2013.01)

(58) Field of Classification Search
CPC ...... G06F 3/1235; G06F 3/121; G06F 3/1279; G06F 3/1294
See application file for complete search history.

(56) References Cited

U.S. PATENT DOCUMENTS

| 6,560,729 B1* | 5/2003 | Anuntapong | G11C 29/56 324/762.02 |
| 6,993,690 B1* | 1/2006 | Okamoto | G11C 16/20 365/185.33 |
| 2006/0048001 A1* | 3/2006 | Honda | G11B 27/00 714/6.32 |

(Continued)

FOREIGN PATENT DOCUMENTS

| JP | H07-244563 A | 9/1995 |
| JP | 2006-175564 A | 7/2006 |

(Continued)

*Primary Examiner* — Iriana Cruz

(74) *Attorney, Agent, or Firm* — Oliff PLC

(57) ABSTRACT

A print system includes a memory, a replacement information output unit, and a display controller. The memory includes plural storage media that store image data to be supplied to a printer. The replacement information output unit receives, from each of the plural storage media, attribute information representing an internal state of the storage medium, and outputs information specifying a storage medium that needs to be replaced among the plural storage media by using the attribute information. The display controller receives the information output by the replacement information output unit and performs control to display, on a display, for the storage medium specified by the information, information indicating a physical position of the storage medium in the memory and indicating that the storage medium needs to be replaced.

11 Claims, 11 Drawing Sheets

(56) References Cited

U.S. PATENT DOCUMENTS

| | | | |
|---|---|---|---|
| 2010/0134958 A1* | 6/2010 | Disaverio | H05K 7/1457 361/627 |
| 2010/0251011 A1 | 9/2010 | Takagi et al. | |
| 2013/0019122 A1 | 1/2013 | Daikokuya et al. | |
| 2013/0044355 A1* | 2/2013 | Teshima | G06F 11/2082 358/1.16 |
| 2014/0268201 A1 | 9/2014 | Mochizuki | |

FOREIGN PATENT DOCUMENTS

| | | |
|---|---|---|
| JP | 2008-003495 A | 1/2008 |
| JP | 2010-224732 A | 10/2010 |
| JP | 2010-238124 A | 10/2010 |
| JP | 2013-020544 A | 1/2013 |
| JP | 2013-041430 A | 2/2013 |
| JP | 2014-178860 A | 9/2014 |

\* cited by examiner

FIG. 4

| ATTRIBUTE INFORMATION | CONDITION | |
|---|---|---|
| | THRESHOLD FOR "DEGRADATION OF PERFORMANCE" | THRESHOLD FOR "REPLACEMENT" |
| RAW READ ERROR RATE | A1 | A2 |
| THROUGHPUT PERFORMANCE | B1 | B2 |
| SEEK ERROR RATE | C1 | C2 |
| READ ERRORS CORRECTED WITH POSSIBLE DELAYS | D1 | D2 |

Ｕ S 9,891,873 B2

PRINT SYSTEM, DISPLAY CONTROL DEVICE, DISPLAY CONTROL METHOD, AND NON-TRANSITORY COMPUTER READABLE MEDIUM THAT SPECIFIES A STORAGE MEDIUM TO BE REPLACED

CROSS-REFERENCE TO RELATED APPLICATIONS

This application is based on and claims priority under 35 USC 119 from Japanese Patent Application No. 2015-214866 filed Oct. 30, 2015.

BACKGROUND

Technical Field

The present invention relates to a print system, a display control device, a display control method, and a non-transitory computer readable medium.

SUMMARY

According to an aspect of the invention, there is provided a print system including a memory, a replacement information output unit, and a display controller. The memory includes plural storage media that store image data to be supplied to a printer. The replacement information output unit receives, from each of the plural storage media, attribute information representing an internal state of the storage medium, and outputs information specifying a storage medium that needs to be replaced among the plural storage media by using the attribute information. The display controller receives the information output by the replacement information output unit and performs control to display, on a display, for the storage medium specified by the information, information indicating a physical position of the storage medium in the memory and indicating that the storage medium needs to be replaced.

BRIEF DESCRIPTION OF THE DRAWINGS

An exemplary embodiment of the present invention will be described in detail based on the following figures, wherein:

FIG. 4 is a diagram illustrating an example of a state determination table;

DETAILED DESCRIPTION

Hereinafter, an exemplary embodiment of the present invention will be described in detail with reference to the attached drawings.

Overall Configuration of Image Forming Apparatus

Figure 1:
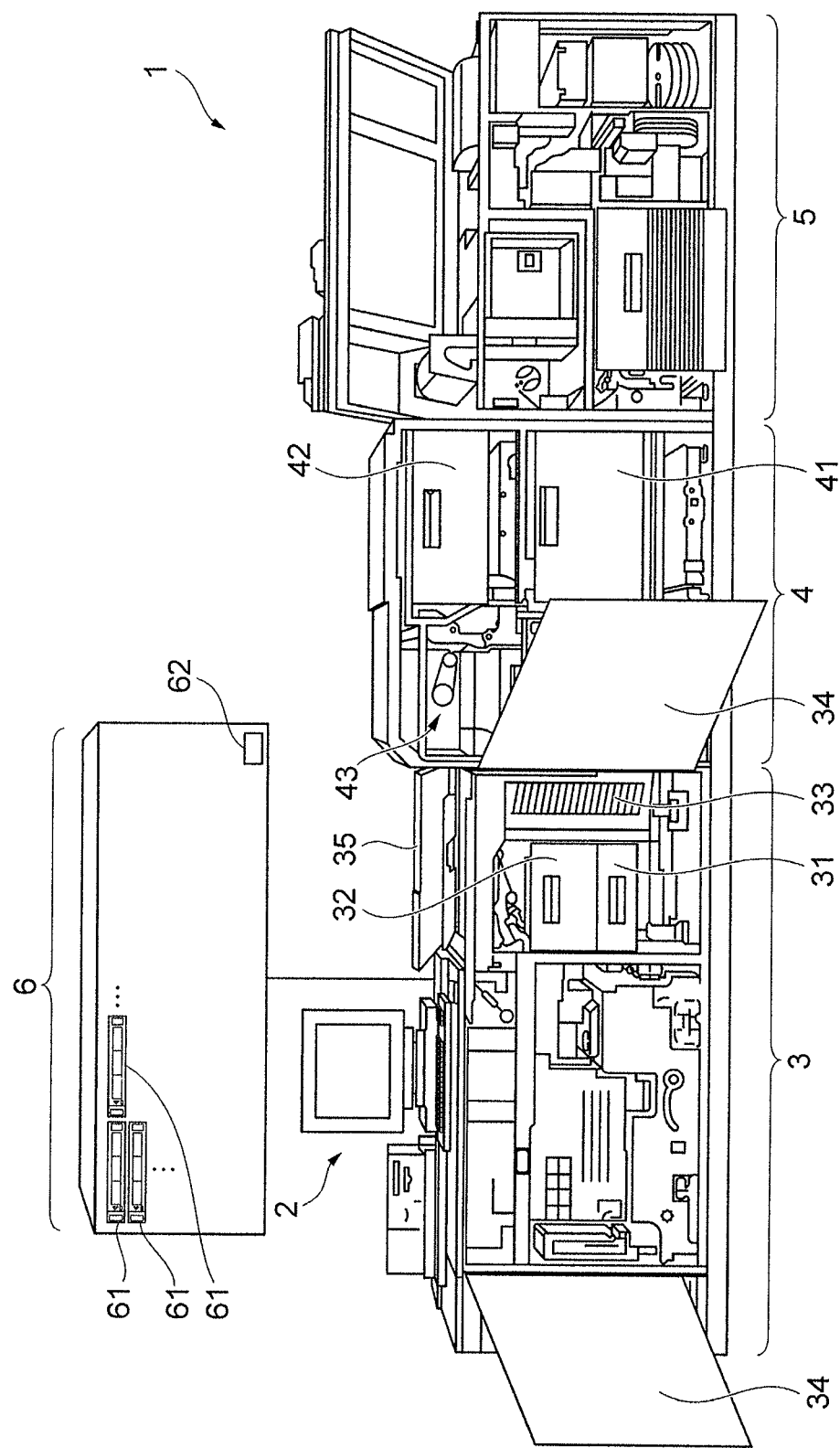
FIG. 1 is a diagram illustrating an example of the overall configuration of an image forming apparatus according to the exemplary embodiment.

FIG. 1 is a diagram illustrating an example of the overall configuration of an image forming apparatus 1 according to the exemplary embodiment.

The image forming apparatus 1 includes a controller 2 that controls individual mechanism units of the image forming apparatus 1 and an image forming unit 3 functioning as a print mechanism for forming an image on a sheet (recording material or recording medium). The image forming apparatus 1 further includes a sheet container 4 that contains sheets to be used by the image forming unit 3, a post-processor 5 that performs post-processing on a sheet on which an image has been formed by the image forming unit 3, and a memory 6 that stores print data (image data) to be supplied to the image forming unit 3.

In the exemplary embodiment, the image forming apparatus 1 has a function as an example of a print system. The image forming unit 3 has a function as an example of a printer. The controller 2 has a function as an example of a display control device.

The controller 2 of the image forming apparatus 1 is connected to a network (not illustrated) and receives print data from a personal computer (PC) or the like (not illustrated) via the network. The controller 2 processes the received print data and temporarily stores the print data in the memory 6. The controller 2 sequentially reads the print data from the memory 6 in accordance with the print speed of the image forming unit 3 and transmits the read print data to the image forming unit 3.

The controller 2 monitors the state of the image forming apparatus 1. If an abnormality occurs in the image forming apparatus 1, the controller 2 displays an image associated with an operation that is to be performed by an operator in the event of the abnormality and presents the image to the operator. The controller 2 also displays the state of the memory 6 and presents it to the operator.

The controller 2 stores log information representing a history of various processes performed in the image forming apparatus 1 inside the controller 2 or in the memory 6. The controller 2 includes input devices such as a touch panel and a keyboard and accepts an operation from the operator.

The image forming unit 3 forms an image on a sheet by using plural coloring materials on the basis of the print data supplied from the controller 2. The image forming unit 3 according to the exemplary embodiment employs, for example, an electrophotographic system. Specifically, in the image forming unit 3, a drum-shaped photoreceptor is evenly charged, and the photoreceptor is exposed to light that is controlled on the basis of the print data, so that an electrostatic latent image is formed on the photoreceptor. Then, a developing device makes the electrostatic latent image a visible image (toner image) by using toner, which is a coloring material. The toner image is transferred onto a sheet, heat and pressure are applied to the toner image by a fixing device so as to fix the toner image, and thereby an image is formed.

The image forming unit 3 is not limited to the one employing the electrophotographic system, and may employ an inkjet system in which ink is used as a coloring material and an image is formed by ejecting ink onto a recording medium.

The image forming unit 3 includes sheet trays 31 and 32, which are separated from sheet trays 41 and 42 (described below) of the sheet container 4. Also, the image forming unit 3 includes a transport system (not illustrated) for transporting sheets from the sheet trays 31 and 32 to the image forming unit 3.

The image forming unit 3 further includes an ejection tray unit 33. A sheet on which an image has been formed by the image forming unit 3 is ejected to the ejection tray unit 33 unless the sheet needs post-processing by the post-processor 5.

The image forming unit 3 includes lids 34 and 35 that are openable and closable. By opening the lids 34 and 35, maintenance of the image forming unit 3, for example, adjustment of individual mechanism units, replacement of consumables, or clearance of a paper jam, may be performed.

The sheet container 4 includes the sheet trays 41 and 42. The sheet trays 41 and 42 are capable of containing sheets, like the sheet trays 31 and 32. A sheet suitable for print data is selected by the controller 2, the selected sheet is taken from any one of the sheet trays 31, 32, 41, and 42, and the sheet is transported to the image forming unit 3 by the transport system (not illustrated).

The sheet container 4 is a so-called optional unit and may be added if the sheet trays 31 and 32 of the image forming unit 3 are insufficient to supply required types of sheets. Thus, the sheet container 4 is not necessarily provided if the sheet trays 31 and 32 are sufficient.

The sheet container 4 includes a sheet transport unit 43 at its upper part. When post-processing is performed by the post-processor 5, a sheet is transported by the sheet transport unit 43 from the image forming unit 3 to the post-processor 5.

The post-processor 5 performs post-processing, for example, cutting, folding, punching, binding, or bookbinding, on sheets on which an image has been formed. The post-processor 5 is also a so-called optional unit. If no post-processing is required, it is not necessary to connect the post-processor 5.

The memory 6 stores print data received from a PC or the like (not illustrated). Here, the memory 6 includes, for example, several tens to several hundreds of hard disk drives (HDDs) 61 and stores the print data in the HDDs 61. Each of the HDDs 61 has a capacity of 500 GB or 1 TB, for example. The memory 6 has such a large storage area. Accordingly, when pieces of print data are sequentially transmitted from the memory 6 to the image forming unit 3 in accordance with the print speed of the image forming unit 3, printing is performed such that intermittent printing (printing at a certain interval in which an unnecessary white sheet is inserted between printing operations) does not occur.

The individual HDDs 61 mounted in the memory 6 have attribute information representing the internal states thereof. The controller 2 is notified of the attribute information about the individual HDDs 61, so that the controller 2 grasps the states of the individual HDDs 61. Self-monitoring, analysis and reporting technology (S.M.A.R.T) is used as the attribute information, for example. S.M.A.R.T. is information representing an internal state issued by an HDD for the purpose of early detection of failure or prediction of breakdown of the HDD.

The memory 6 includes a power supply unit 62, which supplies power to each HDD 61 under control performed by the controller 2.

In the exemplary embodiment, the HDDs 61 are used as an example of storage media. Hereinafter, each of plural HDDs 61 may be referred to as an HDD 61, and plural HDDs 61 may be collectively referred to as an HDD 61.

Example of Functional Configuration of Controller

Figure 2:
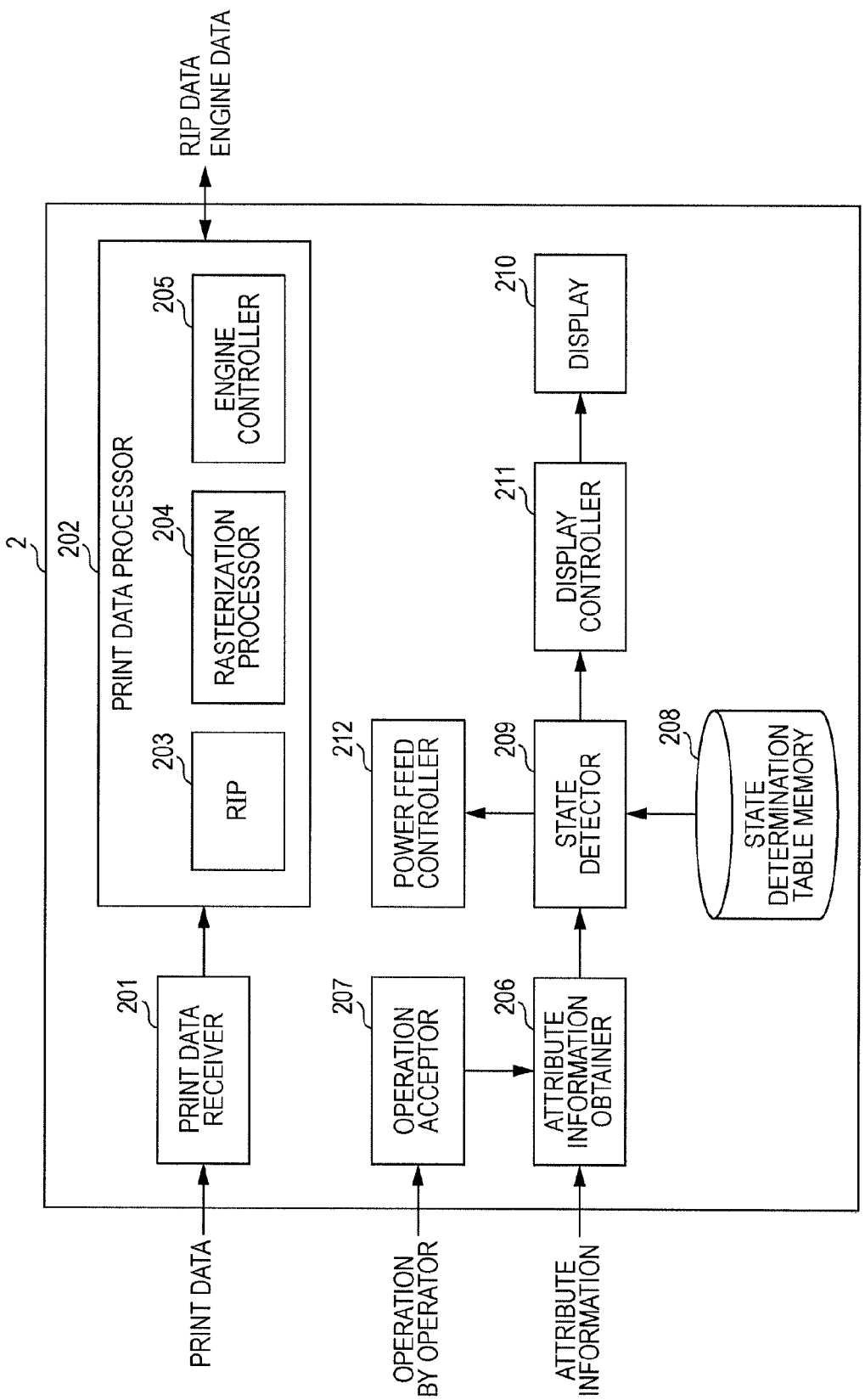
FIG. 2 is a block diagram illustrating an example of the functional configuration of a controller.

Next, the functional configuration of the controller 2 included in the image forming apparatus 1 will be described. FIG. 2 is a block diagram illustrating an example of the functional configuration of the controller 2.

The controller 2 includes a print data receiver 201 that receives print data from a PC or the like, and a print data processor 202 that performs processing on the received print data and outputs the processed print data to the image forming unit 3. The controller 2 also includes an attribute information obtainer 206 that obtains attribute information from each of the plural HDDs 61 mounted in the memory 6, an operation acceptor 207 that accepts an operation by an operator, a state determination table memory 208 that stores a state determination table (described below), and a state detector 209 that detects the state of each HDD 61. The controller 2 further includes a display 210 that displays various images, a display controller 211 that controls the content to be displayed on the display 210, and a power feed controller 212 that controls power feed to each HDD 61.

The print data receiver 201 receives print data of each page described in a page description language (PDL) from a PC or the like (not illustrated) via a network. Hereinafter, print data described in a PDL may particularly be referred to as PDL data.

The print data processor 202 processes the PDL data of each page received by the print data receiver 201, so as to generate raster image processor (RIP) data such as intermediate data, for example, engine data such as raster image data, and supplies the generated engine data to the image forming unit 3, so that the image forming unit 3 prints the engine data on a sheet. The print data processor 202 includes a raster image processor (RIP) 203, a rasterization processor 204, and an engine controller 205.

The RIP 203 interprets the PDL of PDL data and generates RIP data representing the image of the PDL data on the basis of the interpretation result. Intermediate data as an example of the RIP data is intermediate data between PDL data and raster image data that is able to be handled by the image forming unit 3. In the PDL data, an image is expressed by a group of drawing commands for each object that forms the image. In contrast, in the raster image data, an image is expressed by a group of pixels each having a set of a predetermined number of color values. The intermediate data is data having intermediate granularity between the PDL data and the raster image data, in which an image is expressed by a group of sub-objects obtained by dividing an object of PDL. The engine data is data in a data format handled by the image forming unit 3. The engine data may be raster image data if the image forming unit 3 is able to handle raster image data, and may be intermediate data if the image forming unit 3 is able to handle intermediate data.

The RIP data generated by the RIP 203 is output to the memory 6 and is stored in the memory 6. Hereinafter, the processing for generating RIP data by interpreting a PDL is referred to as RIP processing.

The rasterization processor 204 performs conversion processing for converting data into raster image data, which is called rasterization processing, on the RIP data, so as to generate engine data. The rasterization processor 204 collects the RIP data stored in the memory 6 and generates engine data from the collected RIP data. If the image forming unit 3 includes plural recording engines and if the individual recording engines are configured to handle individual colors such as cyan (C), magenta (M), yellow (Y), and black (K), engine data is generated as pieces of image data for the individual colors. The engine data generated by the rasterization processor 204 is output to the memory 6 and is stored in the memory 6.

The engine controller 205 sequentially reads print data (engine data) of each page in page order from the memory 6 in accordance with the print speed of the image forming unit 3 and supplies the read engine data to the image forming unit 3, so that the image forming unit 3 prints the engine data on sheets. The image forming unit 3 transmits a completion signal to the engine controller 205 every time the image forming unit 3 completes printing of engine data of one page on a sheet. In response to the completion signal, the engine controller 205 reads engine data of the next page from the memory 6 and transmits the engine data to the image forming unit 3.

The attribute information obtainer 206 obtains attribute information from each of the plural HDDs 61 mounted in the memory 6. The attribute information obtainer 206 obtains the attribute information, for example, in response to an operation by an operator or at a certain time interval. The attribute information obtained from each HDD 61 is associated with information for specifying the HDD 61 that holds the attribute information, such as the host name or IP address of the HDD 61.

The operation acceptor 207 accepts an operation by an operator through a touch panel, keyboard, or the like. For example, the operation acceptor 207 accepts an operation for obtaining attribute information about each HDD 61.

The state determination table memory 208 stores a table in which conditions for determining the state of each HDD 61 are predetermined for each piece of attribute information (hereinafter referred to as a state determination table). For example, the attribute information "raw read error rate" represents the rate of error that occurs when data is read from the HDD 61. If it is assumed that the error rate increases as the value of this piece of attribute information decreases and if the value is smaller than a predetermined threshold, it is estimated that there is something wrong with the magnetic disk or magnetic head in the HDD 61. Thus, the state determination table defines that, if the value of "raw read error rate" is smaller than the predetermined threshold, the HDD 61 needs to be replaced or the replacement timing for the HDD 61 is approaching.

The state detector 209 detects the state of each HDD 61 with reference to the state determination table and the attribute information about each HDD 61 obtained by the attribute information obtainer 206. The state detector 209 outputs information representing the HDD 61 that needs to be replaced or information representing the HDD 61 for which the replacement timing is approaching among the plural HDDs 61 mounted in the memory 6. For example, if the value of "raw read error rate" for one of the plural HDDs 61 is smaller than the predetermined threshold, the state detector 209 outputs information specifying the one HDD 61 that needs to be replaced.

The display 210 displays various images, such as an image representing the state of the HDD 61, in response to a control signal transmitted from the display controller 211.

The display controller 211 generates a control signal for controlling display on the display 210 and controls the content to be displayed on the display 210. The display controller 211 specifies the HDD 61 that needs to be replaced or the HDD 61 for which the replacement timing is approaching among the plural HDDs 61 mounted in the memory 6 on the basis of the information output from the state detector 209. The display controller 211 displays, on the display 210, information indicating the physical position of the HDD 61 that needs to be replaced (the position specified as the location of the HDD 61 that needs to be replaced in the locational configuration in the memory 6) and indicating that the HDD 61 needs to be replaced. Also, the display controller 211 displays, on the display 210, information indicating the physical position of the HDD 61 for which the replacement timing is approaching and indicating that the replacement timing of the HDD 61 is approaching.

The power feed controller 212 controls power feed to each HDD 61 mounted in the memory 6. If the information output from the state detector 209 indicates that there is an HDD 61 that needs to be replaced and if the memory 6 includes a standby HDD 61, the power feed controller 212 feeds power to the standby HDD 61. The power feed controller 212 then performs switching from the HDD 61 that needs to be replaced to the standby HDD 61.

In the exemplary embodiment, the state detector 209 has a function as an example of a replacement information output unit. The display controller 211 has a function as an example of a display controller. The power feed controller 212 has a function as an example of a power feed controller.

Hardware Configuration of Controller

Figure 3:
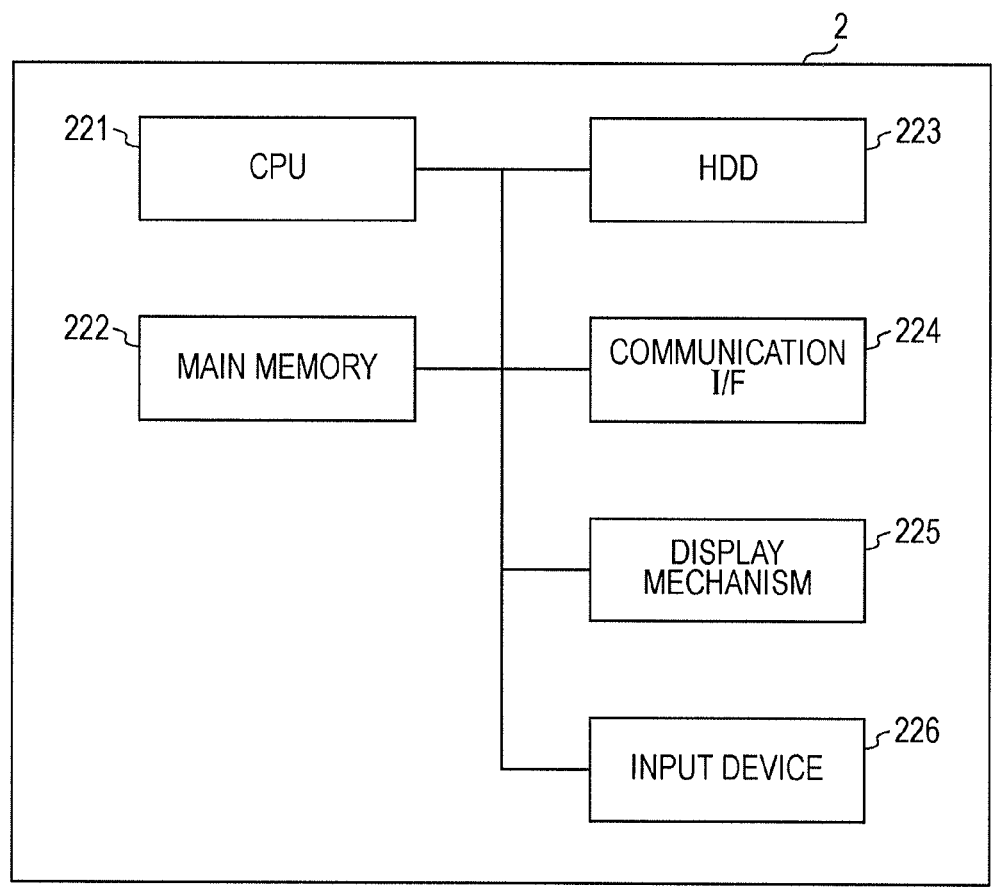
FIG. 3 is a block diagram illustrating an example of the hardware configuration of the controller.

Next, the hardware configuration of the controller 2 will be described. FIG. 3 is a diagram illustrating an example of the hardware configuration of the controller 2. As illustrated in FIG. 3, the controller 2 includes a central processing unit (CPU) 221 functioning as an arithmetic unit, a main memory 222 functioning as a storage unit, and an HDD 223.

The CPU 221 executes various programs such as an operating system (OS) and an application and implements the individual functions of the controller 2. The main memory 222 is a storage area that stores the various programs and data to be used for executing the programs. The HDD 223 is a storage area that stores input data for the various programs and output data from the various programs. The controller 2 further includes a communication interface (I/F) 224 for communicating with an external apparatus, a display mechanism 225 including a video memory, display, or the like, and an input device 226 such as a touch panel or a keyboard.

The individual functional units included in the controller 2 illustrated in FIG. 3 are implemented by software and hardware resources that cooperate with each other. Specifically, the CPU 221 loads a program for implementing the print data receiver 201, the print data processor 202, the attribute information obtainer 206, the operation acceptor 207, the state detector 209, the display controller 211, the power feed controller 212, and so forth, for example, from the HDD 223 to the main memory 222 and executes the program, and thereby these functional units are implemented. The operation acceptor 207 is implemented by, for example, the input device 226. The state determination table memory 208 is implemented by, for example, the HDD 223. The display 210 is implemented by, for example, the display mechanism 225.

State Determination Table

Next, a specific example of the state determination table stored in the state determination table memory 208 will be described. FIG. 4 is a diagram illustrating an example of the state determination table. In the example illustrated in FIG.

4, there are four pieces of attribute information. In general, there are other pieces of attribute information of S.M.A.R.T., and five or more pieces of attribute information may be defined in the state determination table.

As illustrated in FIG. 4, the state determination table defines, for each piece of attribute information, conditions for determining the state of each HDD 61. In the example illustrated in FIG. 4, a threshold for determining whether or not the performance of the HDD 61 has degraded (threshold for "degradation of performance") and a threshold for determining whether or not the HDD 61 needs to be replaced (threshold for "replacement") are defined as conditions for determining the state of the HDD 61. The conditions such as these thresholds may be determined by conducting an experiment or the like in advance on the same type of HDDs as the HDDs 61 mounted in the memory 6.

For example, the attribute information "raw read error rate" represents the rate of error that occurs when data is read from the HDD 61, as described above. For "raw read error rate", a threshold "A1" for determining whether or not the performance of the HDD 61 has degraded and a threshold "A2" for determining whether or not the HDD 61 needs to be replaced are defined. The threshold "A2" is smaller than the threshold "A1". If the value of the attribute information "raw read error rate" obtained from the HDD 61 is smaller than the threshold "A1", the state detector 209 determines that the performance of the HDD 61 has degraded and the replacement timing is approaching. If the value of the attribute information "raw read error rate" obtained from the HDD 61 is smaller than the threshold "A2", the state detector 209 determines that the HDD 61 needs to be replaced.

"Throughput performance" is attribute information representing the overall throughput of the HDD 61. For the HDD 61 in which this value is smaller than a threshold "B1", it is determined that the performance has degraded and the replacement timing is approaching. For the HDD 61 in which this value is smaller than a threshold "B2", it is determined that the HDD 61 needs to be replaced. "Seek error rate" is attribute information representing the rate of failure in shift of the magnetic head of the HDD 61 to the track of target data (seek error). For the HDD 61 in which this value is smaller than a threshold "C1", it is determined that the performance has degraded and the replacement timing is approaching. For the HDD 61 in which this value is smaller than a threshold "C2", it is determined that the HDD 61 needs to be replaced.

"Read errors corrected with possible delays" is attribute information representing an occurrence trend of a response delay that occurs sporadically. In general, a sporadic delay resulting from degradation of a mechanism component of a hard disk is not detected as an error of the hard disk in many cases, but the occurrence trend may be determined on the basis of the value of "read errors corrected with possible delays". For the HDD 61 in which this value is smaller than a threshold "D1", it is determined that the performance has degraded and the replacement timing is approaching. For the HDD 61 in which this value is smaller than a threshold "D2", it is determined that the HDD 61 needs to be replaced.

In the example illustrated in FIG. 4, two thresholds about "degradation of performance" and "replacement" are defined for each piece of attribute information, but the configuration of the table is not limited thereto. For example, two thresholds may be defined for a piece of attribute information and only one threshold may be defined for another piece of attribute information. Also, the type of threshold provided for attribute information may be changed for each piece of attribute information. Alternatively, plural thresholds about "degradation of performance" may be provided so as to indicate the degree of degradation of performance.

Furthermore, for example, if there is attribute information that is detected if an error occurs in the HDD 61, no thresholds may be defined for the attribute information, and the state detector 209 may determine, for the HDD 61 for which the attribute information has been obtained, that the HDD 61 needs to be replaced.

In the example illustrated in FIG. 4, conditions about "degradation of performance" and "replacement" are defined, but the configuration of the table is not limited thereto. For example, a state of the HDD 61 other than degradation of performance and necessity of replacement may be defined and a condition for determining the state may be provided.

Procedure of Displaying HDD that Needs to be Replaced

Figure 5:
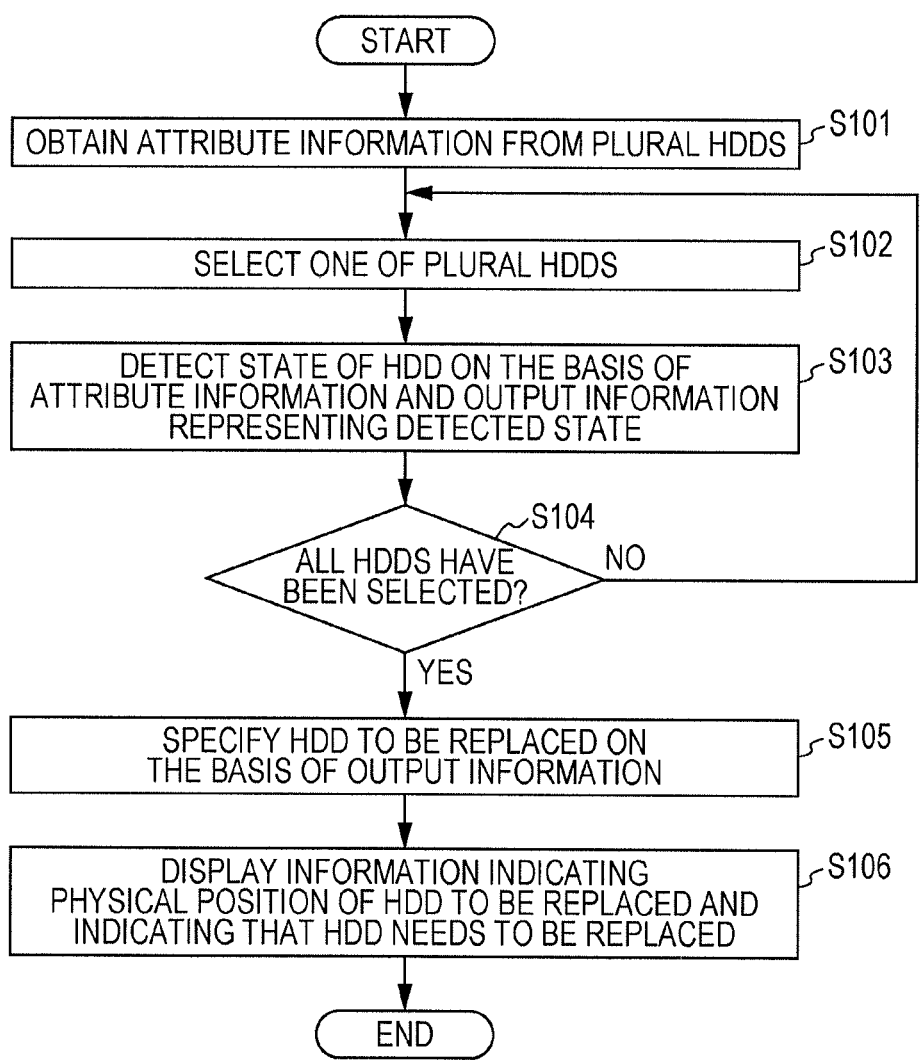
FIG. 5 is a flowchart illustrating an example of a procedure of displaying a physical position of an HDD that needs to be replaced.

Next, a procedure of displaying the physical position of the HDD 61 that needs to be replaced, performed by the controller 2, will be described with reference to a flowchart. FIG. 5 is a flowchart illustrating an example of the procedure of displaying the physical position of the HDD 61 that needs to be replaced. In the procedure illustrated in FIG. 5, a description will be given of an example of displaying the physical position of the HDD 61 that needs to be replaced. Also in the case of displaying the physical position of the HDD 61 for which the replacement timing is approaching or the HDD 61 in a state other than degradation of performance and necessity of replacement, processing is performed in a similar procedure.

In step S101, the operation acceptor 207 accepts an instruction to "obtain attribute information" from an operator, and accordingly the attribute information obtainer 206 obtains attribute information from each of the plural HDDs 61 mounted in the memory 6. In step S102, the state detector 209 selects one of the plural HDDs 61. In step S103, the state detector 209 detects the state of the selected HDD 61 on the basis of the attribute information obtained from the selected HDD 61 with reference to the state determination table, and outputs information representing the detected state.

In step S103, the state detector 209 obtains, for the selected HDD 61, various pieces of attribute information defined in the state determination table illustrated in FIG. 4. The state detector 209 determines whether or not the selected HDD 61 needs to be replaced on the basis of the obtained pieces of attribute information with reference to the state determination table. The state detector 209 may determine whether or not the HDD 61 needs to be replaced by using one of the pieces of attribute information obtained from the HDD 61, or may determine whether or not the HDD 61 needs to be replaced by using plural pieces of attribute information. If the selected HDD 61 does not need to be replaced, the state detector 209 may output information representing that fact.

In step S104, the state detector 209 determines whether or not all of the plural HDDs 61 mounted in the memory 6 have been selected. If a negative determination is made (NO) in step S104, the process returns to step S102. If a positive determination is made (YES) in step S104, the process proceeds to step S105, where the display controller 211 specifies the HDD 61 that needs to be replaced on the basis of the information output from the state detector 209 in step S103.

In step S106, the display controller 211 displays, on the display 210, information indicating the physical position of the HDD 61 that needs to be replaced and indicating that the HDD 61 needs to be replaced. The operator may check the physical position of the HDD 61 that needs to be replaced on the screen displayed on the display 210 and may replace the HDD 61. After that, this processing flow ends.

In step S103, the state detector 209 determines, on the basis of the attribute information obtained from the HDD 61, whether or not the replacement timing is approaching, and thereby the physical position of the HDD 61 for which the replacement timing is approaching is displayed. Also, in step S103, the state detector 209 determines, on the basis of the attribute information obtained from the HDD 61, whether or not the HDD 61 is in a state other than degradation of performance and necessity of replacement, and thereby the physical position of the HDD 61 in the other state is displayed.

In step S103, if the information output from the state detector 209 indicates that there is the HDD 61 that needs to be replaced and if a standby HDD 61 is located in advance in the memory 6, the power feed controller 212 may feed power to the standby HDD 61. Also, the power feed controller 212 may perform switching from the HDD 61 that needs to be replaced to the standby HDD 61.

Example of Display of HDD

Next, a specific example of display of the HDDs 61 performed by the controller 2 will be described. FIGS. 6 to 9 are diagrams for describing examples of display of the HDDs 61 performed by the controller 2. Here, a description will be given of two configuration examples: a first configuration and a second configuration, as the configuration of the memory 6 in which the HDDs 61 are mounted.

First, the first configuration of the memory 6 will be described with reference to FIGS. 6 and 7.

Figure 6:
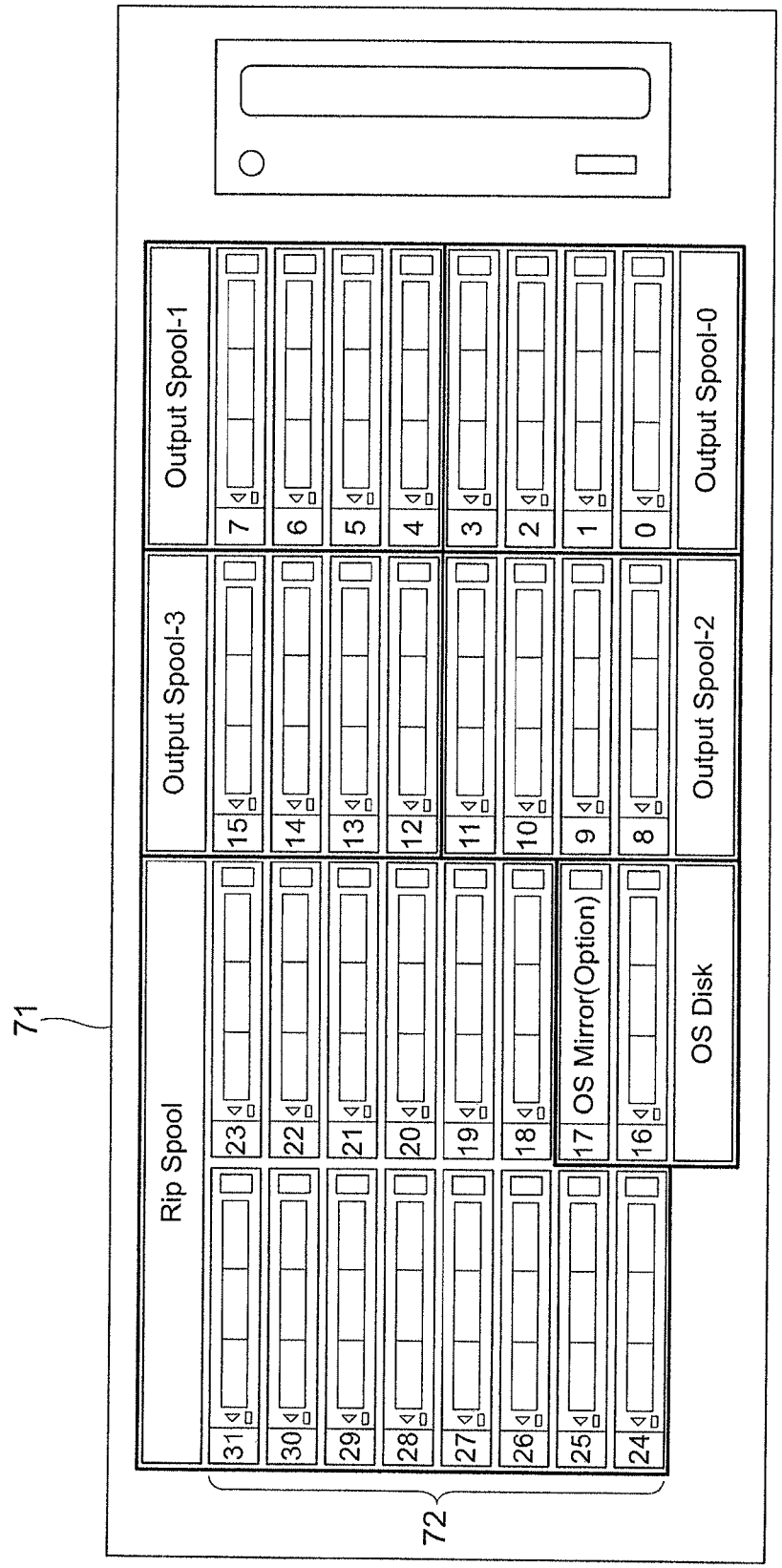
FIG. 6 is a diagram for describing an example of display of HDDs performed by the controller.

FIG. 6 is a diagram illustrating an example of an image representing the locational configuration of the HDDs 61 inside the memory 6. As illustrated in FIG. 6, the physical positions of the individual HDDs 61 mounted in the memory 6 are displayed as relative positions of the individual HDDs 61 in a housing (box) corresponding to the entire memory 6. In the exemplary embodiment, as illustrated in FIG. 6, an image 71 representing the mount state of the HDDs 61 in the memory 6 is prepared. At the physical position of each HDD 61, an image (so-called icon) 72 representing the HDD 61 is displayed. With the image 71 being displayed on the display 210, the physical positions of the individual HDDs 61 are presented to an operator.

In the example illustrated in FIG. 6, thirty-two HDDs 61 in total are located in the memory 6. The inside of the memory 6 includes six areas "Rip Spool", "OS Disk", "Output Spool-0", "Output Spool-1", "Output Spool-2", and "Output Spool-3". For each area, the type of data to be stored is determined.

"Rip Spool" is an area for storing intermediate data generated through conversion from PDL data in RIP processing. In other words, "Rip Spool" stores RIP data generated by the RIP 203. In the example illustrated in FIG. 6, fourteen HDDs 61 with numbers "18" to "31" are located in "Rip Spool". The HDDs 61 in "Rip Spool" have a configuration of so-called redundant arrays of inexpensive disks (RAID) 0, and the fourteen HDDs 61 are collectively handled as one HDD 61. For example, if one of the fourteen HDDs 61 in "Rip Spool" breaks down, the operator replaces the HDD 61 by a new one, and then RAID is reconstructed with the fourteen HDDs 61.

"OS Disk" is an area for storing system disks that store an OS and software required to operate the OS. In the example illustrated in FIG. 6, two HDDs 61 with numbers "16" and "17" are located in "OS Disk". The system disks have the configuration of so-called RAID1 and are operated by dual redundancy (mirroring) with two HDDs 61. That is, the two HDDs 61 with the numbers "16" and "17" store the same content. If one of the HDDs 16 breaks down, data is read from the other HDD 61. For example, if one of the two HDDs 61 in "OS Disk" breaks down, the operator replaces the HDD 61 by a new one, and then RAID is reconstructed with the two HDDs 61. For the HDD 61 on the backup side, an icon with characters "OS Mirror (Option)" is displayed.

Each of "Output Spool-0", "Output Spool-1", "Output Spool-2", and "Output Spool-3" is an area for storing engine data generated through conversion from the RIP data stored in "Rip Spool". If the image forming unit 3 includes recording engines that handle raster image data of individual colors C, M, Y, and K, "Output Spool-1" stores raster image data of the color C, "Output Spool-2" stores raster image data of the color M, "Output Spool-3" stores raster image data of the color Y, and "Output Spool-0" stores raster image data of the color K. In other words, "Output Spool-0", "Output Spool-1", "Output Spool-2", and "Output Spool-3" store engine image data of the respective colors generated by the rasterization processor 204.

In the example illustrated in FIG. 6, four HDDs 61 with numbers "12" to "15" are located in "Output Spool-3 (Y)", four HDDs 61 with numbers "8" to "11" are located in "Output Spool-2 (M)", four HDDs 61 with numbers "4" to "7" are located in "Output Spool-1 (C)", and four HDDs 61 with numbers "0" to "3" are located in "Output Spool-0 (K)".

The four HDDs 61 in "Output Spool-0", the four HDDs 61 in "Output Spool-1", the four HDDs 61 in "Output Spool-2", and the four HDDs 61 in "Output Spool-3" have the configuration of RAID0. For example, the four HDDs 61 in "Output Spool-0" are collectively handled as one HDD. For example, if one of the four HDDs 61 in "Output Spool-0" breaks down, the operator replaces the HDD 61 by a new one, and then RAID is reconstructed with the four HDDs 61.

Figure 7:
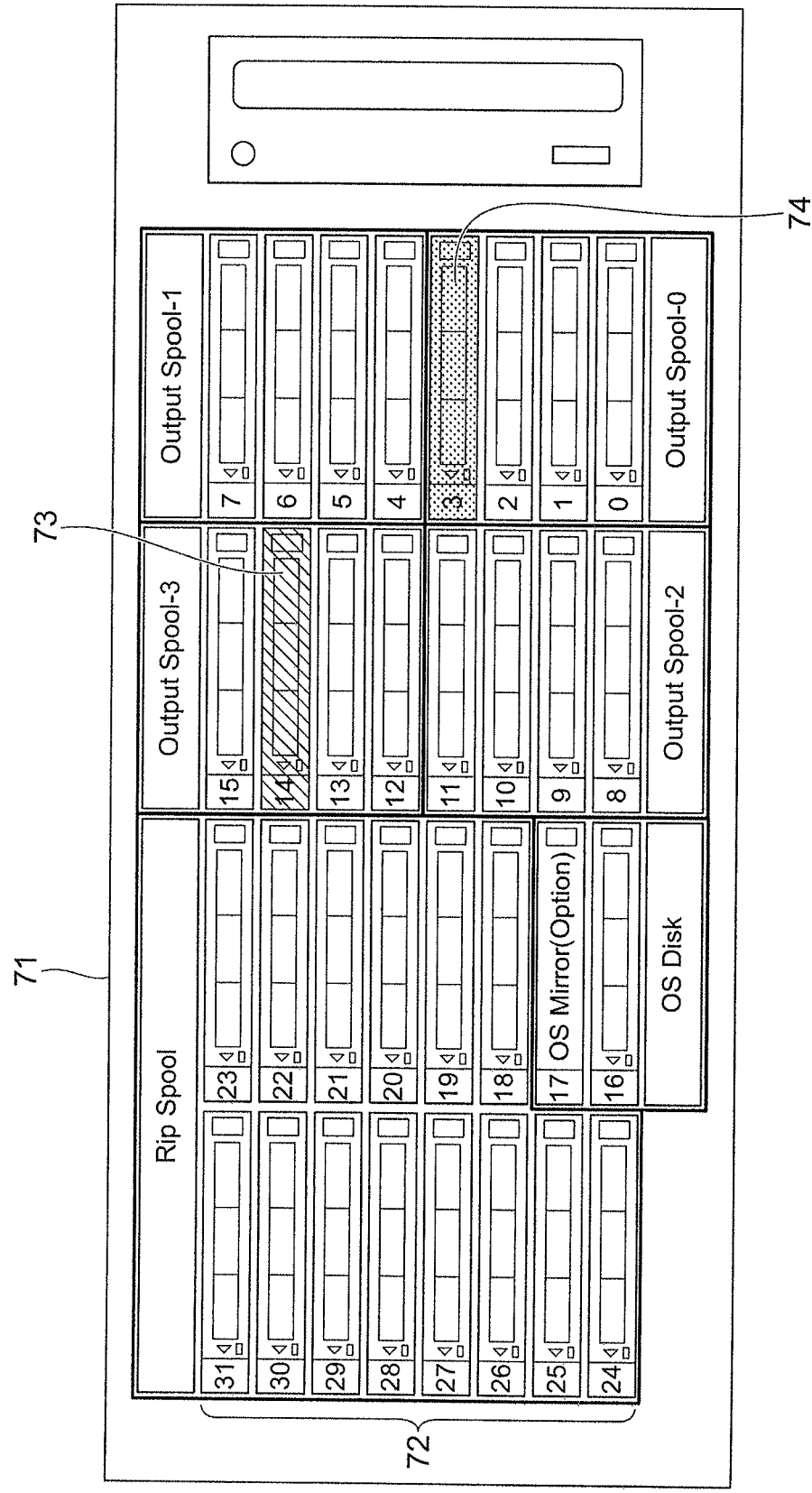
FIG. 7 is a diagram for describing an example of display of HDDs performed by the controller.

FIG. 7 is a diagram illustrating an example of display of the HDDs 61 based on attribute information. In the example illustrated in FIG. 7, the state detector 209 determines, on the basis of attribute information about the HDD 61 with the number "14" located in "Output Spool-3", that the HDD 61 needs to be replaced. As a result, an icon 73 indicating the necessity of replacement is displayed at the physical position of the HDD 61 with the number "14", as illustrated in FIG. 7. In this example, the icon 73 indicating the necessity of replacement is displayed on the icon indicating the physical position of the HDD 61. The icon 73 may be displayed in a different color (for example, red) from the color of icons displayed for the other normal HDDs 61, or characters "replacement required" may be added, so as to emphasize the necessity of replacement.

The display controller 211 may also display the states of other HDDs 61 than the HDD 61 that needs to be replaced. In the example illustrated in FIG. 7, the state detector 209 determines, on the basis of attribute information about the HDD 61 with the number "3" located in "Output Spool-0", that the HDD 61 is degraded in performance and the replacement timing is approaching. As a result, an icon 74 indicating that the performance is degraded is displayed at the physical position of the HDD 61 with the number "3", as illustrated in FIG. 7. In this example, the icon 74 indicating that the performance is degraded is displayed on the icon indicating the physical position of the HDD 61. The icon 74 may be displayed in a different color (for example, yellow) from the color of icons displayed for other normal HDDs 61 or the HDD 61 that needs to be replaced, or characters "warning" or the like may be added, so as to emphasize the degradation of performance.

When displaying an icon at the physical position of the HDD 61, the display controller 211 considers an orthogonal coordinate system in the entire image 71 representing the locational configuration inside the memory 6. For example, the upper-left corner of the image 71 is regarded as an origin O (0, 0), the horizontal axis of the image 71 is regarded as an x coordinate, and the vertical axis of the image 71 is regarded as a y coordinate. The display controller 211 stores in advance coordinate information corresponding to the physical positions of the individual HDDs 61. For example, in the case of displaying an icon indicating the necessity of replacement, the display controller 211 first obtains coordinate information corresponding to the physical position of the HDD 61 that needs to be replaced from among pieces of coordinate information about the individual HDDs 61 stored in advance. The display controller 211 then performs processing of displaying the icon indicating the necessity of replacement at the position indicated by the obtained coordinate information. Break-down of the HDD 61 may occur in the area storing RIP data as well as the area storing engine data. Thus, the icons indicating "replacement required" and "warning" may be applied to the HDDs 61 that belong to "Rip Spool".

Next, the second configuration of the memory 6 will be described with reference to FIGS. 8 and 9.

Figure 8:
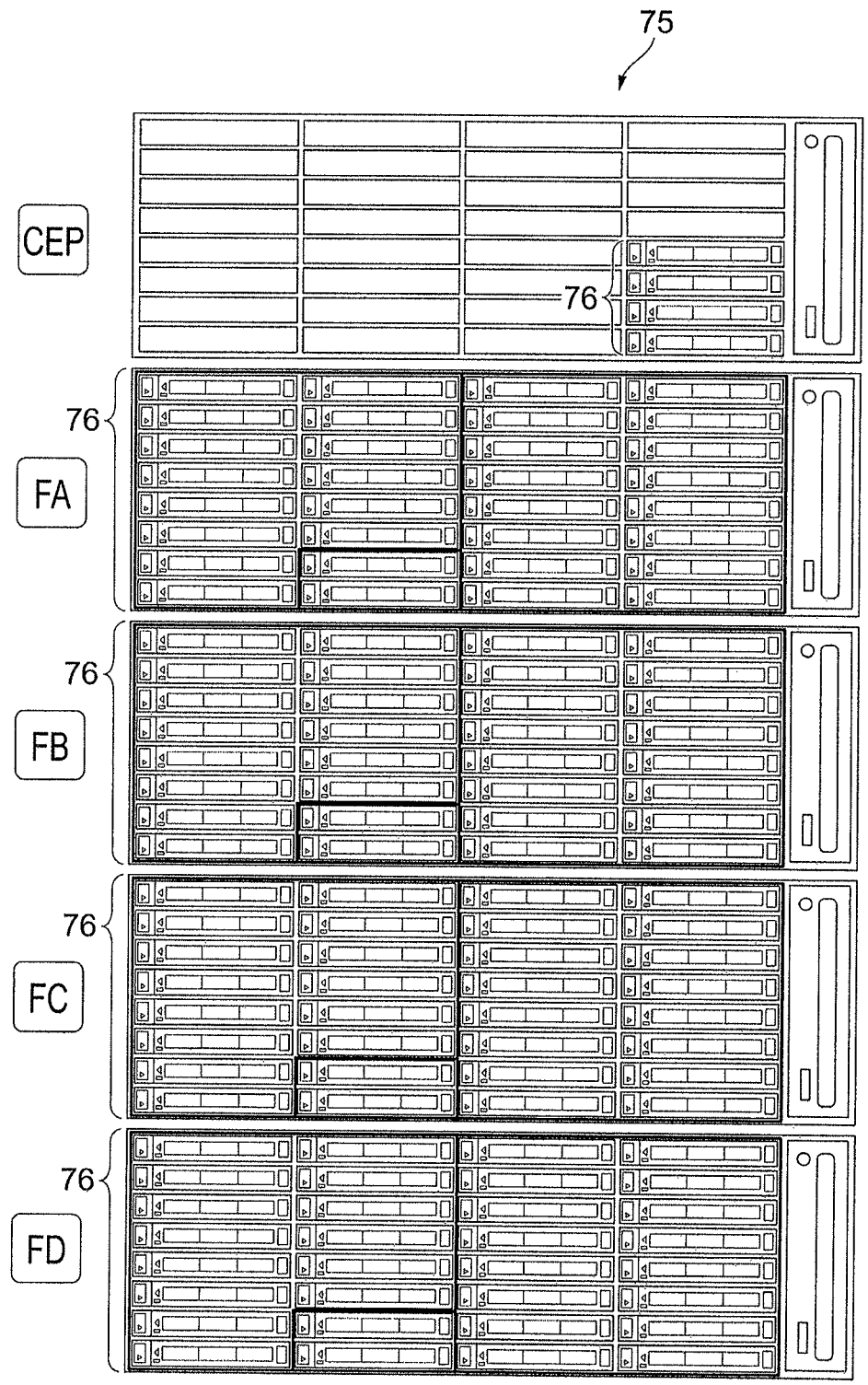
FIG. 8 is a diagram for describing an example of display of HDDs performed by the controller.
Figure 9:
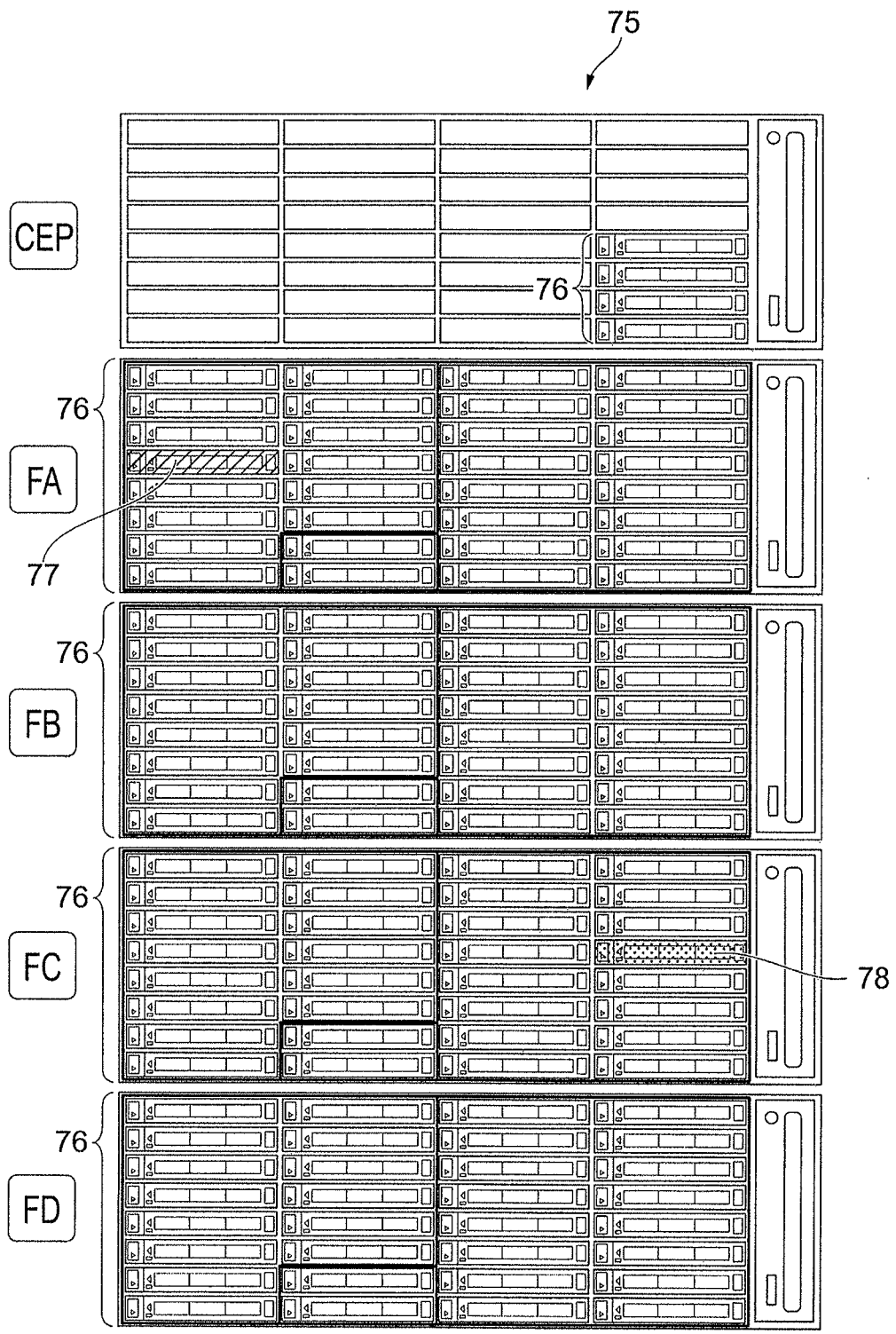
FIG. 9 is a diagram for describing an example of display of HDDs performed by the controller.

FIG. 8 is a diagram illustrating an example of an image representing the locational configuration of the HDDs 61 inside the memory 6. As in the example illustrated in FIG. 6, the physical positions of the individual HDDs 61 mounted in the memory 6 are displayed as relative positions of the individual HDDs 61 in a housing (box) corresponding to the entire memory 6. Here, an image 75 representing the mount state of the HDDs 61 in the memory 6 is prepared, as illustrated in FIG. 8. At the physical position of each HDD 61, an image (icon) 76 representing the HDD 61 is displayed.

Here, the memory 6 includes five areas "CEP", "FA", "FB", "FC", and "FD". For each area, the type of data to be stored is determined.

"CEP" is an area for storing software that executes complex event processing (CEP) in which a determined action is immediately performed. Thirty-two HDDs 61 may be located in this area. In the example illustrated in FIG. 8, four HDDs 61 are located. The remaining twenty-eight HDDs 61 have not yet been located.

Each of "FA", "FB", "FC", and "FD" is an area for storing RIP data, system disks, and engine data handled by the recording engines included in the image forming unit 3. Specifically, for example, RIP data, system disks, and Y-color raster image data are stored in "FA". RIP data, system disks, and M-color raster image data are stored in "FB". RIP data, system disks, and C-color raster image data are stored in "FC". RIP data, system disks, and K-color raster image data are stored in "FD".

In each of the areas "FA", "FB", "FC", and "FD", thirty-two HDDs 61 in total may be located. Specifically, in each area, fourteen HDDs 61 for storing RIP data may be located. Also, two HDDs 61 for storing system disks may be located. Further, sixteen HDDs 61 for storing engine data may be located. In the example illustrated in FIG. 8, in each of the areas "FA", "FB", "FC", and "FD", the range where the HDDs 61 for storing RIP data are located, the range where the HDDs 61 for storing system disks are located, and the range where the HDDs 61 for storing engine data are located are defined by bold lines. Fourteen HDDs 61 for storing RIP data, two HDDs 61 for storing system disks, and sixteen HDDs 61 for storing engine data are located.

In the second configuration, as in the first configuration, an icon indicating the necessity of replacement or an icon indicating that performance is degraded is displayed at the physical position of the HDD 61. FIG. 9 is a diagram illustrating an example of display of the HDDs 61 based on attribute information. For example, an icon 77 indicating the necessity of replacement is displayed at the physical position of the HDD 61 that needs to be replaced. For example, an icon 78 indicating that the performance is degraded is displayed at the physical position of the HDD 61 whose performance is degraded.

The display controller 211 may display an icon indicating another state at the physical position of the HDD 61 that is in a state other than degradation of performance and necessity of replacement. Further, the display controller 211 may display an icon indicating a normal state at the physical position of the HDD 61 that is in a normal state.

The display controller 211 may display, as icons indicating the states of the HDDs 61, only an icon indicating the necessity of replacement or icons indicating the states of all the HDDs 61 mounted in the memory 6. Alternatively, the display controller 211 may display an icon indicating a state for only a predetermined specific HDD 61.

Various types of processing may be performed on the HDD 61, for example, processing of checking the state of the HDD 61 by the state detector 209, RAID reconstruction, formatting, and defragmentation. Thus, the display controller 211 may display an icon indicating that processing is in progress at the physical position of the HDD 61 when the processing is being performed on the HDD 61. In other words, the display controller 211 may display an icon indicating the state of processing that is in progress at the physical position of the HDD 61, in addition to an icon indicating a state based on attribute information. Examples of the icon that is displayed include icons indicating "state check in progress", "RAID reconstruction in progress", "formatting in progress", and "defragmentation in progress".

When displaying an icon at the physical position of the HDD 61, the display controller 211 may emphasize the icon by blinking it. For example, the icon indicating the necessity of replacement may be blinked.

Figure 10:
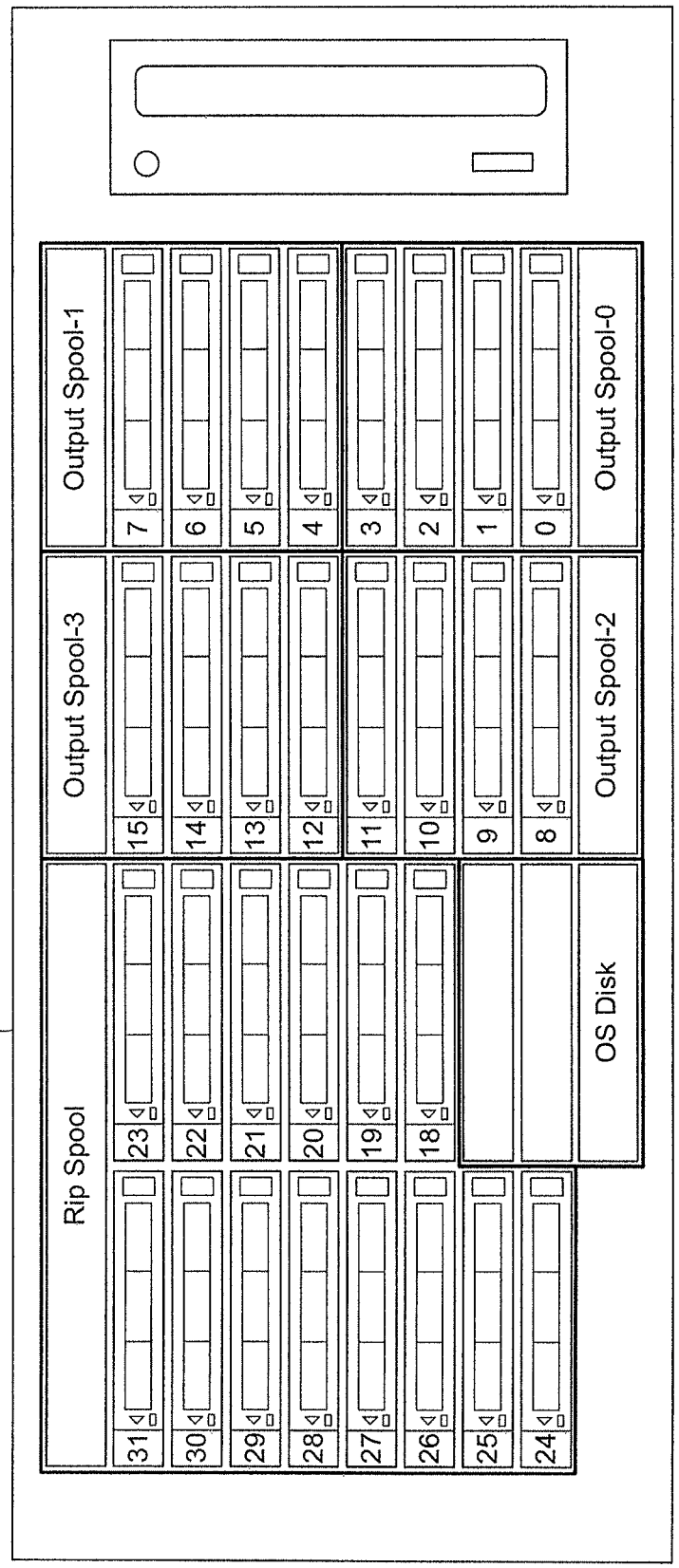
FIG. 10 is a diagram for describing an example of a case of not displaying specific HDDs.

The display controller 211 does not necessarily display a specific HDD 61, such as a system disk, when displaying the states of the HDDs 61. FIG. 10 is a diagram for describing an example of a case where specific HDDs 61 are not displayed. In the image 71 illustrated in FIG. 10, the icons of the HDDs 61 of the system disks located in the area "OS Disk" are not displayed in the memory 6 of the first configuration. Since the system disks include software that operates the OS, a malfunction may occur in the memory 6 if the operator operates the system disks. Thus, the physical positions of the system disks may be hidden from the operator.

Figure 11:
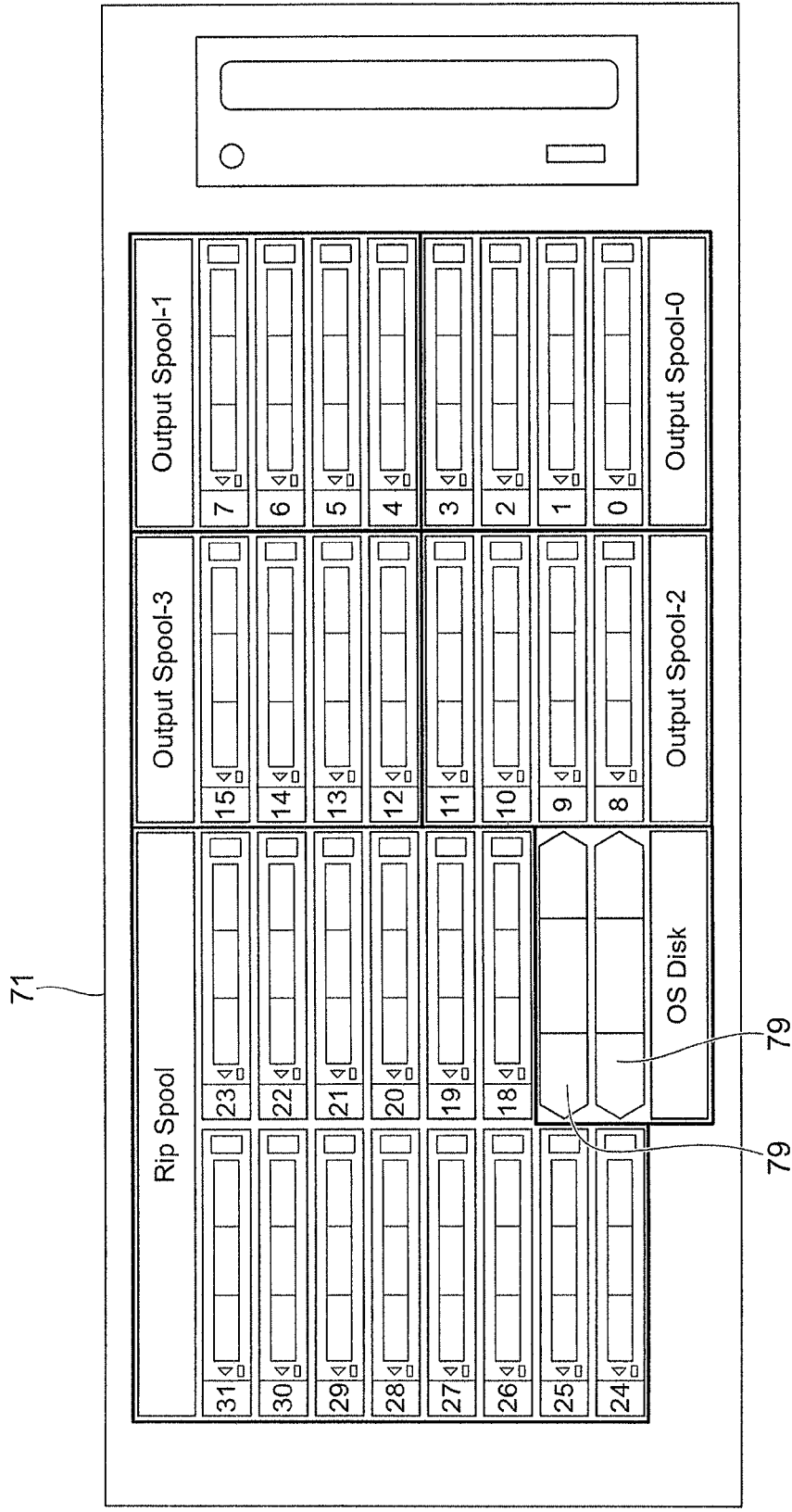
FIG. 11 is a diagram for describing an example of a case of displaying specific HDDs in a different manner from a manner in which the other HDDs are displayed.

The display controller 211 may display specific HDDs 61, such as system disks, in a different manner from a manner in which other HDDs 61 than the specific HDDs 61 are displayed. FIG. 11 is a diagram for describing an example of the case of displaying specific HDDs 61 in a different manner from a manner in which the other HDDs 61 are displayed. In the image 71 illustrated in FIG. 11, icons 79 different from the other icons are displayed for only the HDDs 61 as system disks located in the area "OS Disk" in the memory 6 of the first configuration. In this way, the system disks may be displayed in a different manner from a manner in which the other HDDs 61 are displayed. The different manner may be a manner other than use of a different icon. For example, characters indicating the system disks may be added.

In the exemplary embodiment, processing of RAID reconstruction is performed after the HDD 61 in the memory 6 is replaced by a new HDD 61. At this time, it is determined whether or not the new HDD 61 is an unused HDD. For example, in the case of reusing a used HDD 61, the used HDD 61 is more likely to be broken than an unused HDD 61. Thus, it is determined whether or not the newly located HDD 61 is an unused HDD 61 under control by the system disks. If the newly located HDD 61 is an unused HDD 61, RAID reconstruction is completed. On the other hand, if the newly located HDD 61 is a used HDD 61, RAID reconstruction is not performed and an error occurs. In this case, the display controller 211 displays, at the physical position of the newly located HDD 61, an icon indicating that error has occurred because the HDD 61 is a used HDD.

In this way, the display controller 211 displays the physical positions of the individual HDDs 61 located in the memory 6 and also displays states or the like of the HDDs 61. The configuration of the memory 6 is not limited to that illustrated in FIG. 6 or 8. For example, the memory 6 may include two or more configurations (housings), each being the configuration illustrated in FIG. 6 or 8.

As described above, in the image forming apparatus 1 according to the exemplary embodiment, the controller 2 obtains attribute information from each of the plural HDDs 61 located in the memory 6, and specifies the HDD 61 that needs to be replaced on the basis of the obtained attribute information. The controller 2 then displays the physical position of the HDD 61 that needs to be replaced and presents the physical position to the operator. Accordingly, the operator may check the screen displayed on the display 210, specify the position of the HDD 61 that needs to be replaced, and replace the HDD 61. Also, the image forming apparatus 1 displays the physical position of the HDD 61 for which the replacement timing is approaching, the HDD 61 in a state other than degradation of performance and necessity of replacement, or the like, and presents the physical position to the operator.

In the exemplary embodiment, HDDs are mounted in the memory 6, but the mounted storage media are not limited to HDDs. For example, solid state drives (SSDs) may be mounted in the memory 6 instead of the HDDs.

In the exemplary embodiment, the controller 2 includes the display 210. Alternatively, the display 210 may be provided outside the controller 2, and the display controller 211 may transmit a control signal for controlling display to the display 210 provided outside.

A program implementing the exemplary embodiment of the present invention may be provided by a communication unit or may be provided by storing it in a storage medium such as a compact disc-read only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print system comprising:
a memory that includes a plurality of storage media that store image data to be supplied to a printer; and
a processor configured to:
receive, from each of the plurality of storage media, attribute information representing an internal state of the storage medium,
output, using the attribute information, information specifying a storage medium among the plurality of storage media that needs to be replaced, and
perform control to display on a display, for the storage medium specified by the information, information (i) indicating a physical position of the storage medium in the memory and (ii) indicating that the storage medium needs to be replaced, wherein:
the displayed information is displayed by way of an image representing the plurality of storage media at individual relative positions corresponding to physical positions of the plurality of storage media in a housing for the memory,
a part of the image representing the storage medium that needs to be replaced indicates that the storage medium needs to be replaced, and
a part of the image representing a storage medium whose performance is degraded indicates, in a manner different than the part of the image representing the storage medium that needs to be replaced, that the storage medium is degraded and its replacement time is thus approaching.

2. The print system according to claim 1, wherein the display controller does not display an image representing a specific storage medium among the plurality of storage media located in the memory.

3. The print system according to claim 1, wherein the display controller displays an image representing a specific storage medium among the plurality of storage media located in the memory in a different manner from a manner in which an image representing other storage media than the specific storage medium is displayed.

4. The print system according to claim 1, wherein if one of the plurality of storage media located in the memory is replaced with a certain storage medium and if the certain storage medium is not an unused storage medium, the display controller displays information indicating a physical position of the certain storage medium and indicating that the certain storage medium is not an unused storage medium.

5. The print system according to claim 1, wherein the display controller displays information indicating physical positions of other storage media than the storage medium that needs to be replaced among the plurality of storage media located in the memory and indicating states of the other storage media.

6. The print system according to claim 1, further comprising:
a power feed controller that controls power feed to the plurality of storage media located in the memory,
wherein if the replacement information output unit outputs the information specifying the storage medium that needs to be replaced, the power feed controller feeds power to a standby storage medium that is located in advance.

7. A display control device comprising a processor configured to:

receive, from each of a plurality of storage media that are included in a memory and that store image data to be supplied to a printer, attribute information representing an internal state of the storage medium;

output, using the attribute information, information specifying a storage medium among the plurality of storage media that needs to be replaced; and perform control to display on a display, for the storage medium specified by the information, information (i) indicating a physical position of the storage medium in the memory and (ii) indicating that the storage medium needs to be replaced, wherein:

the displayed information is displayed by way of an image representing the plurality of storage media at individual relative positions corresponding to physical positions of the plurality of storage media in a housing for the memory, a part of the image representing the storage medium that needs to be replaced indicates that the storage medium needs to be replaced, and a part of the image representing a storage medium whose performance is degraded indicates, in a manner different than the part of the image representing the storage medium that needs to be replaced, that the storage medium is degraded and its replacement time is thus approaching.

8. A display control method comprising:

receiving, from each of a plurality of storage media that are included in a memory and that store image data to be supplied to a printer, attribute information representing an internal state of the storage medium;

outputting, using the attribute information, information specifying a storage medium among the plurality of storage media that needs to be replaced; and performing control to display on a display, for the storage medium specified by the information, information (i) indicating a physical position of the storage medium in the memory and (ii) indicating that the storage medium needs to be replaced, wherein:

the displayed information is displayed by way of an image representing the plurality of storage media at individual relative positions corresponding to physical positions of the plurality of storage media in a housing for the memory, a part of the image representing the storage medium that needs to be replaced indicates that the storage medium needs to be replaced, and a part of the image representing a storage medium whose performance is degraded indicates, in a manner different than the part of the image representing the storage medium that needs to be replaced, that the storage medium is degraded and its replacement time is thus approaching.

9. A non-transitory computer readable medium storing a program causing a computer to execute a process, the process comprising:

receiving, from each of a plurality of storage media that are included in a memory and that store image data to be supplied to a printer, attribute information representing an internal state of the storage medium;

outputting, using the attribute information, information specifying a storage medium among the plurality of storage media that needs to be replaced; and performing control to display on a display, for the storage medium specified by the information, information (i) indicating a physical position of the storage medium in the memory and (ii) indicating that the storage medium needs to be wherein:

the displayed information is displayed by way of an image representing the plurality of storage media at individual relative positions corresponding to physical positions of the plurality of storage media in a housing for the memory, a part of the image representing the storage medium that needs to be replaced indicates that the storage medium needs to be replaced, and a part of the image representing a storage medium whose performance is degraded indicates, in a manner different than the part of the image representing the storage medium that needs to be replaced, that the storage medium is degraded and its replacement time is thus approaching.

10. The print system according to claim 1, wherein the storage medium that needs to be replaced is displayed differently in the image than other ones of the plurality of storage media that are operating normally.

11. The print system according to claim 1, wherein the part of the image representing the storage medium that needs to be replaced blinks.

* * * * *